United States Patent
Al Shamsi et al.

(10) Patent No.: US 11,878,799 B2
(45) Date of Patent: Jan. 23, 2024

(54) METHOD AND SYSTEM FOR CONFIGURING AN INTERIOR OF A RECONFIGURABLE VEHICLE

(71) Applicant: Dubai Aviation Engineering Projects, Dubai (AE)

(72) Inventors: Abdullah Al Shamsi, Dubai (AE); Erwin Angerbauer, Dubai (AE)

(73) Assignee: Dubai Aviation Engineering Projects, Dubai (AE)

(*) Notice: Subject to any disclaimer, the term of this patent is extended or adjusted under 35 U.S.C. 154(b) by 794 days.

(21) Appl. No.: 16/967,829

(22) PCT Filed: Feb. 8, 2018

(86) PCT No.: PCT/IB2018/050777
§ 371 (c)(1),
(2) Date: Aug. 6, 2020

(87) PCT Pub. No.: WO2019/155256
PCT Pub. Date: Aug. 15, 2019

(65) Prior Publication Data
US 2021/0039786 A1    Feb. 11, 2021

(51) Int. Cl.
*G06F 30/15* (2020.01)
*B64D 11/00* (2006.01)
(Continued)

(52) U.S. Cl.
CPC ............ *B64D 11/00* (2013.01); *B64F 5/10* (2017.01); *B64G 1/60* (2013.01); *B64G 1/64* (2013.01);
(Continued)

(58) Field of Classification Search
CPC ... B64D 11/00; B64D 2011/0046; B64F 5/10; B64G 1/60; B64G 1/64; G06F 30/15;
(Continued)

(56) References Cited

U.S. PATENT DOCUMENTS 8,954,301 B2    2/2015  Sieben
9,513,622 B2 *  12/2016 Schmidt-Schäffer ... G06F 30/15
(Continued)

FOREIGN PATENT DOCUMENTS

CN    107531164 A  *  1/2018  .............. B60N 2/00
EP    3263444 A1   *  1/2018  ......... B64D 11/0606
(Continued)

OTHER PUBLICATIONS

International Search Report issued in connection with application No. PCT/IB2018/050777 dated May 7, 2018.

*Primary Examiner* — Kandasamy Thangavelu
(74) *Attorney, Agent, or Firm* — Dennemeyer & Associates LLC (57) ABSTRACT

A method for configuring an interior of a reconfigurable vehicle using one or more cabin modules. The method comprises providing, by a user interface system, a plurality of possible cabin configuration options to a plurality of users for selection by the plurality of users so as to generate selection data indicative of cabin configuration options selected by the users. The cabin configuration options relate to types of configuration of the one or more cabin modules. The method comprises determining an availability of cabin configuration options based on inventory data which relates to types of configuration of cabin modules that are currently available for use so as to generate availability data, and generating a forecast of cabin modules predicted to be loaded on the reconfigurable vehicle based on the selection data and the availability data. The method further comprises updating the availability data and the selection data substantially in real time based on the inventory data and user input to the user interface system so as to generate updated availability data and updated selection data, and modifying the forecast based on the updated availability data and the updated selection data. The method comprises finalizing the
(Continued)

forecast so as to generate commissioning data indicative of cabin modules to be loaded on the reconfigurable vehicle, loading the reconfigurable vehicle with one or more cabin modules based on the commissioning data, and updating the inventory data based on the cabin modules that are loaded on the reconfigurable vehicle.

9 Claims, 8 Drawing Sheets

(51) Int. Cl.
    *B64F 5/10*     (2017.01)
    *B64G 1/60*     (2006.01)
    *B64G 1/64*     (2006.01)
    *G06Q 10/0875*     (2023.01)

(52) U.S. Cl.
    CPC ......... *G06F 30/15* (2020.01); *G06Q 10/0875* (2013.01); *B64D 2011/0046* (2013.01)

(58) Field of Classification Search
    CPC . G06F 2111/20; G06F 30/00; G06Q 10/0875; G06Q 10/02; G06Q 10/087; G06Q 50/30
    See application file for complete search history.

(56) References Cited

U.S. PATENT DOCUMENTS

| | | | | |
|---|---|---|---|---|
| 2010/0082660 | A1* | 4/2010 | Muilenburg | G06F 16/337 707/768 |
| 2014/0310610 | A1* | 10/2014 | Ricci | B60C 1/00 715/744 |
| 2015/0073842 | A1* | 3/2015 | Aljabarti | G06Q 10/02 705/5 |
| 2017/0109666 | A1 | 4/2017 | Gonnsen et al. | |

FOREIGN PATENT DOCUMENTS

| | | | | |
|---|---|---|---|---|
| WO | WO 2015197873 A1 * | 12/2015 | ........... | G06Q 10/043 |
| WO | WO 2017201207 A1 * | 11/2017 | ............ | B64D 11/00 |

\* cited by examiner

METHOD AND SYSTEM FOR CONFIGURING AN INTERIOR OF A RECONFIGURABLE VEHICLE

CROSS-REFERENCE TO RELATED APPLICATIONS

This is a 35 U.S.C. 371 National Stage Patent Application of International Application No. PCT/IB2018/050777, filed Feb. 8, 2018, which is hereby incorporated by reference in its entirety.

BACKGROUND OF THE INVENTION

The present disclosure relates to a method and system for configuring an interior of a reconfigurable vehicle.

The aviation industry is evolving rapidly and aircraft manufacturers are continuously devising new ways to improve customer experience and provide additional functionality of aircraft. Recently, a project has been proposed in which modules may be used to reconfigure the interior of an aircraft. For example, modules may be swapped in and out of the aircraft to provide different experiences such as a spa, a café or a gym depending on a desired configuration of the aircraft. This opens up the possibility that passengers or airlines may wish to select one or more configurations that they might like to experience or use when on the aircraft.

Following a typical booking of a flight, online check-in may open 2 days before a scheduled departure of the aircraft, although booking may generally occur before this, such as weeks or months beforehand. Baggage drop off and document check is typically available three hours before the scheduled departure, and online check-in typically closes 60 minutes before the scheduled departure, along with baggage drop closing (i.e. being unavailable after that time). Generally, a boarding gate for that flight closes 20 minutes before the scheduled departure, after which passengers are typically no longer allowed to board the aircraft.

Currently, if a passenger wishes to make a selection of an available option related to their flight such as a meal or seat preference, this information may be collected by an airline, for example via an online registration system before the flight is due to depart, such as up to 48 hours before the scheduled departure time. Information regarding meal selection may then be passed to an aircraft caterer so that the passenger's chosen meal is loaded onto the aircraft before departure, or information regarding their seat selection may be passed to a check-in system such as an online check-in system or that accessible by a check-in desk at the airport. The passenger's desired choice may then be made available for their flight.

However, some choices may typically only be entered by a passenger and considered by the airline before a predetermined time before the scheduled departure time, such as up to 24 hours beforehand in the case of special meal choices. Any changes or modifications may thus not be taken into account because the information is typically "pushed" to the airport systems or caterers for example. Additionally, any changes made later than this may not be considered, which may be inconvenient for the passengers. Furthermore, such existing systems may be unsuitable for use with aircraft whose interior may be reconfigured, for example by selection of suitable cabin modules that may be loaded on the aircraft, for example in respect of each flight so as to provide different functionality such as café, spa, seating facilities, sleeping facilities, gym facilities and the like.

Examples of the present disclosure seek to address or at least alleviate the above problems.

In a first aspect, there is provided a method for configuring an interior of a reconfigurable vehicle using one or more cabin modules, the method comprising: providing, by a user interface system, a plurality of possible cabin configuration options to a plurality of users for selection by the plurality of users so as to generate selection data indicative of cabin configuration options selected by the users, the cabin configuration options relating to types of configuration of the one or more cabin modules; determining an availability of cabin configuration options based on inventory data which relates to types of configuration of cabin modules that are currently available for use so as to generate availability data; generating a forecast of cabin modules predicted to be loaded on the reconfigurable vehicle based on the selection data and the availability data; updating the availability data and the selection data substantially in real time based on the inventory data and user input to the user interface system so as to generate updated availability data and updated selection data; modifying the forecast based on the updated availability data and the updated selection data; finalizing the forecast so as to generate commissioning data indicative of cabin modules to be loaded on the reconfigurable vehicle; loading the reconfigurable vehicle with one or more cabin modules based on the commissioning data; and updating the inventory data based on the cabin modules that are loaded on the reconfigurable vehicle.

In a second aspect, there is provided a system for configuring an interior of a reconfigurable vehicle using one or more cabin modules, the system comprising: a user interface system operable to provide a plurality of possible cabin configuration options to a plurality of users for selection by the plurality of users so as to generate selection data indicative of cabin configuration options selected by the users, the cabin configuration options relating to types of configuration of the one or more cabin modules; a tracking and availability system operable to determine an availability of cabin configuration options based on inventory data which relates to types of configuration of cabin modules that are currently available for use so as to generate availability data; a forecasting system operable to generate a forecast of cabin modules predicted to be loaded on the reconfigurable vehicle based on the selection data and the availability data; and a commissioning system operable to generate commissioning data indicative of cabin modules to be loaded on the reconfigurable vehicle, in which: the tracking and availability system is operable to update the availability data and the selection data substantially in real time based on the inventory data and user input to the user interface system so as to generate updated availability data and updated selection data; the forecasting system is operable to modify the forecast based on the updated availability data and the updated selection data, and to finalise the forecast so as to generate the commissioning data; the commissioning system is operable to cause the reconfigurable vehicle to be loaded with one or more cabin modules based on the commissioning data; and the tracking and availability system is operable to update the inventory data based on the cabin modules that are loaded on the reconfigurable vehicle.

Other aspects and features are defined in the appended claims.

Therefore, for example, examples of the disclosure may help provide a system and method for configuring an interior of a reconfigurable vehicle that is more flexible and may allow any changes, such as those occurring from user selection or modification, and/or changes occurring due to operational requirements to be taken into account. Furthermore, for example, any changes which may be desired, may be made more closely to the departure time than is currently possible. For example, the vehicle may be configured based on passenger wishes, but any changes of selection, or availability of cabin modules may also be taken into account for example substantially in real time because the forecast may be modified based on the updated selection data and the updated availability data. Thus, for example, a likelihood that a more appropriate selection of cabin modules may be loaded on the vehicle may be improved.

BRIEF DESCRIPTION

Examples of the disclosure will now be described by way of example only with reference to the accompanying drawings, in which like references refer to like parts, and in which.

DETAILED DESCRIPTION

A method and system for configuring an interior of a reconfigurable vehicle is disclosed. In the following description, a number of specific details are presented in order to provide a thorough understanding of the examples of the disclosure. It will be apparent however to a person skilled in the art that these specific details need not be employed in order to practise the examples of the disclosure. Conversely, specific details known to the person skilled in the art are omitted for the purposes of clarity in presenting the examples.

Figure 1:
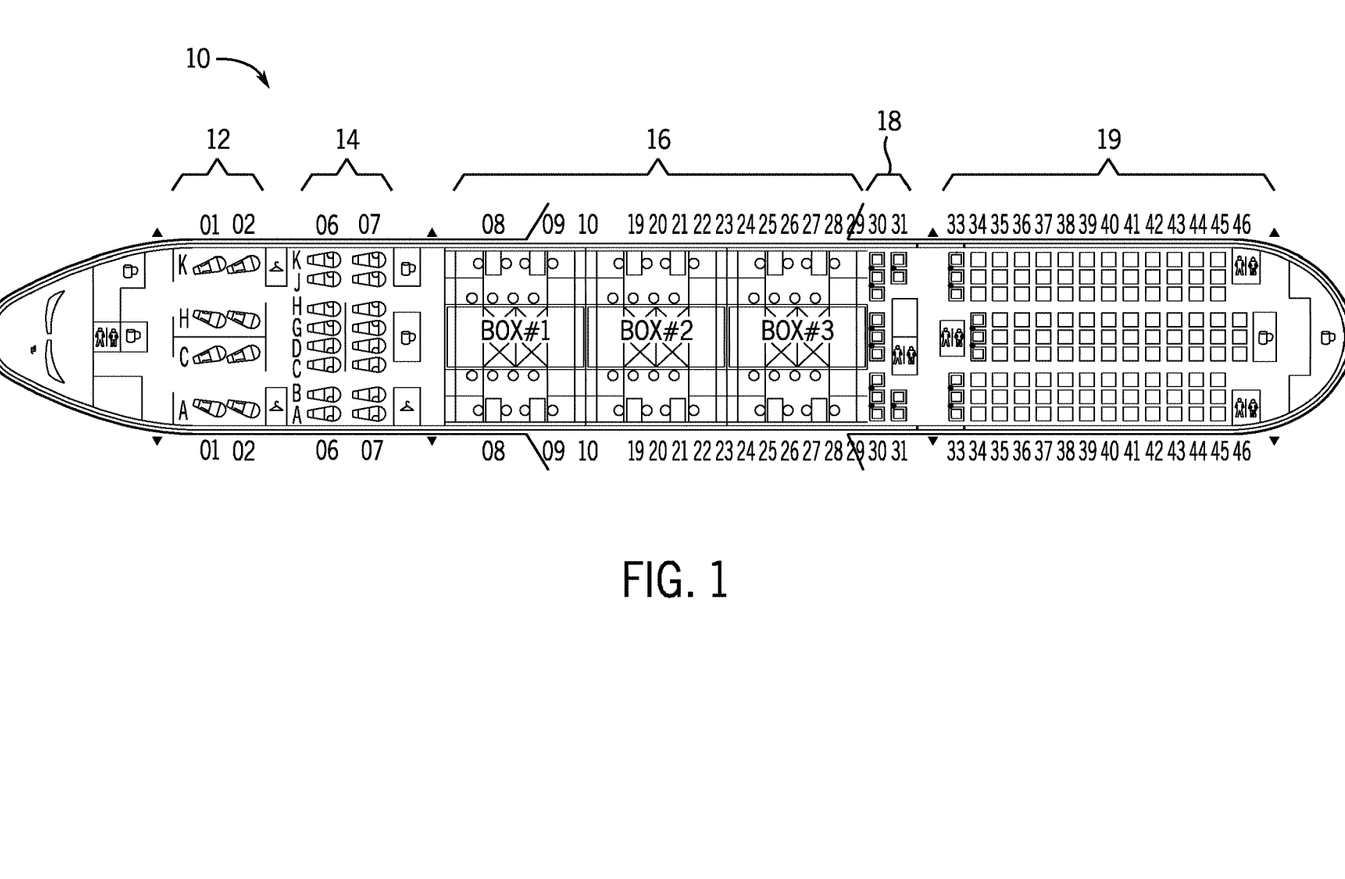
FIG. 1 is a schematic diagram of an interior plan of an aircraft according to examples of the disclosure.

FIG. 1 is a schematic diagram of an interior plan of an aircraft according to examples of the disclosure. In particular, FIG. 1 shows an aircraft 10. In examples, the aircraft is arranged to be able to cooperate with one or more cabin modules that may be deployed inside the aircraft so as to form at least a portion of an interior of the aircraft 10.

In examples, the interior of the aircraft 10 is divided into zones, with each zone being associated with an interior function of the aircraft. In the example shown in FIG. 1, the aircraft 10 comprises a first class zone 12 (rows 01 and 02) in which first class amenities may be located, a business class zone 14 (rows 06 and 07) in which business class amenities such as business class seating may be found, a configurable zone 16 (rows 08-29) which may be configured to be able to provide different amenities or functionality by suitable positioning of one or more cabin modules within the configurable zone 16, a premium economy zone 18 (rows 30-31) in which premium economy class seating may be found, and an economy zone 19 (rows 33-46) in which economy class seating may be found. In the example shown in FIG. 1, Box #1, Box #2 and Box #3 indicate possible positions of cabin modules within the configurable zone 16.

In examples, the configurable zone 16 may comprise one or more cabin modules which provide functionality such as one or more of seating, resting, a restaurant, a bar, a spa, or a play area for example although other functionality could of course be provided. The configurable zone 16 may encompass a whole or a part of a cabin space of the interior of the aircraft 10, for example depending on design requirements. In examples, cabin modules may be loaded and/or unloaded from the aircraft for example based on booking requirements or other requirements. In other words, for example, the aircraft may be considered to be reconfigurable, for example based on customer and/or airline requirements.

Figure 2:
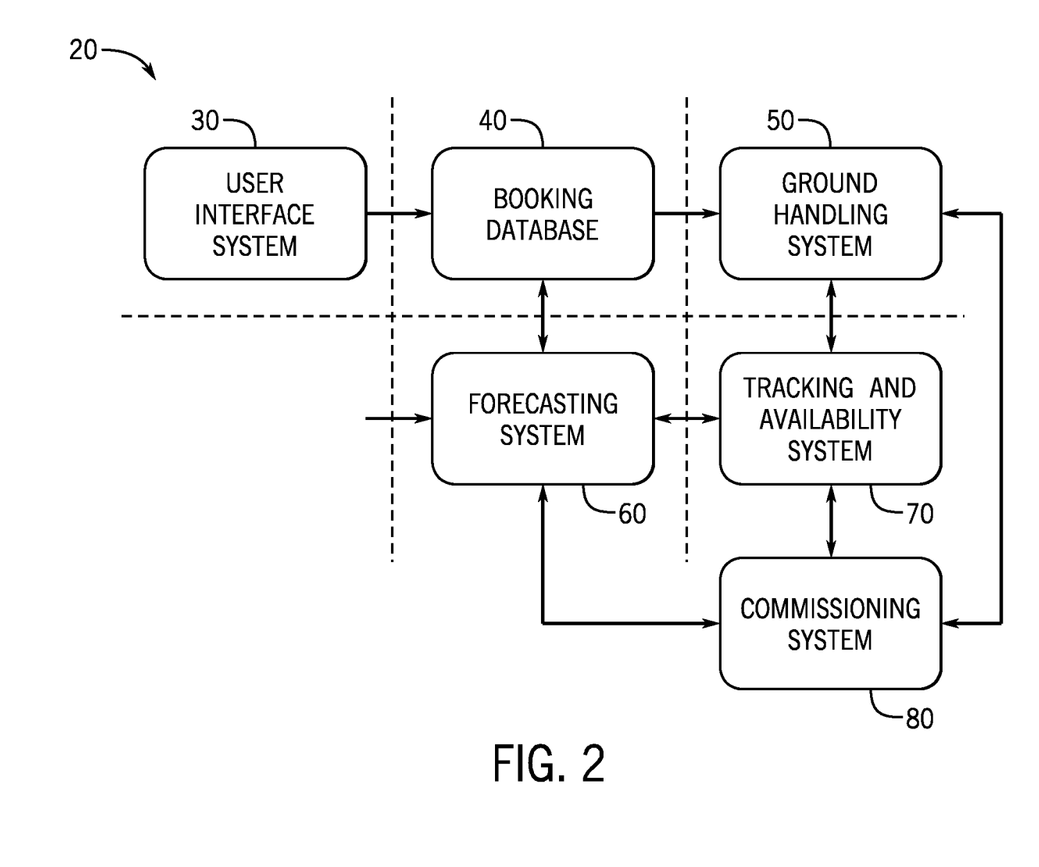
FIG. 2 schematically shows a system for configuring an interior of a reconfigurable vehicle according to examples of the disclosure.

FIG. 2 schematically shows a system for configuring an interior of a reconfigurable vehicle according to examples of the disclosure. In particular, FIG. 2 schematically shows a system 20 for configuring an interior of a reconfigurable vehicle (such as the aircraft 10) using one or more cabin modules. In examples, the system 20 comprises a user interface system 30, a booking database 40, a ground handling system 50, a forecasting system 60, a tracking and availability system 70 and a commissioning system 80. However, in examples one or more of the systems 30, 50, 60, 70, 80, and database 40 of FIG. 2 may be combined together as appropriate. For example, the booking database 40 could be implemented in one or more of the user interface system 30, and the forecasting system 60, or as a separate entity such as on an external server. In examples, the booking database 40 is operable to communicate with the ground handling system 50 so as to be able to provide selection data such as that relating to food choices and seat choices.

In examples, the user interface system 30 is operable to provide a plurality of possible cabin configuration options to a plurality of users for selection by the plurality of users so as to generate selection data. In examples, the selection data is indicative of cabin configuration options selected by the users. In examples, the cabin configuration options relate to types of configuration of the one or more cabin modules. For example, the types of configuration of the one or more cabin modules could relate to one or more of: a restaurant, a child's play area, a gym and/or fitness centre, a seating area, a sleeping area, a game zone, a bar, a café, and a business outlet or vending unit, although it will be appreciated that other configurations are possible.

In examples, the user interface system comprises one or more servers operable to communicate with one or more user devices via a network such as that already commonly used for booking of airline tickets and choosing options such as seating or food options. In examples, the booking database 40 forms part of the user interface system and is configured to be able to store the selection data. In examples, the booking database may operate in relation to food and seat choices for example in a similar manner to that already commonly employed in airline booking systems. However, it will be appreciated that the operation of the user interface system would depend on the functions needed to be performed in respect to the selection data such as that described below.

For example, the selection data may relate to cabin configuration options such as cabin module type or types that a passenger (user) may wish to experience on their flight. For example, passengers of a family with young children may select a cabin module option that relates to a children's play area for the children implemented by one cabin module, and a relaxation area such as a spa cabin module for the parents. In other examples, the selection data may relate to selections by other passengers who may, for example, select a cinema cabin module, a café or bar cabin module, or a cabin module configured as one or more beds. Selection data relating to intended passengers choices for a particular flight to be carried out by the aircraft 10 may thus be stored in the database 40 for example.

In examples, the tracking and availability system 70 is operable to communicate bi-directionally via one or more suitable communication links such as Ethernet, or fibre-optic communication link with the ground handling system 50, the forecasting system 60 and the commissioning system 80, although it will be appreciated that any appropriate communication link or links such as a wireless link could be used. In examples, the user interface system 30, the booking database 40, forecasting system 60, the tracking and availability system 70 and the commissioning system 80 are implemented in computing hardware such as one or more servers, computers, storage units and the like operable to communicate with each other via appropriate communication links or networks for example.

In examples, the ground handling system 50 comprises ground handling infrastructure such as baggage handling equipment, cabin module handling equipment (for example for unloading and loading one or more cabin modules on the aircraft 10) and ground handling computing hardware running appropriate software so as to be able to communicate with the baggage handling equipment, and the cabin module handling equipment for example.

In examples, the computing hardware of examples of the disclosure is configured to run associated software which when executed by the hardware can cause the hardware to carry out the functionality of the methods described herein.

In examples, the tracking and availability system 70 is operable to determine an availability of cabin configuration options based on inventory data so as to generate availability data. In examples, the inventory data relates to types of configuration of cabin modules that are currently available for use so as to generate availability data. In examples, the inventory data is stored in an inventory data database as will be described in more detail later below. For example, the inventory data may indicate a number of cabin configuration modules of each type that are currently available for use, such as numbers of spa modules, café modules, cinema modules, seating modules, sleeping modules, play area modules, bar modules, and the like, although it will be appreciated that other types of cabin module could be used. In examples, the tracking and availability system 70 is operable to update the availability data and the selection data substantially in real time based on the inventory data and user input to the user interface system 30 so as to generate updated availability data and updated selection data. Therefore, for example, the availability data and the selection data, may be kept substantially up to date so that any changes for example may be reflected in the system.

In examples, the forecasting system 60 is operable to communicate bi-directionally with the booking database 40, the tracking and availability system 70 and the commissioning system 80 via suitable communication links such as fibre-optic communication link, or Ethernet, although it will be appreciated that any appropriate communication link or links such as a wireless link could be used. In examples, the forecasting system 60 operable to generate a forecast of cabin modules predicted to be loaded on the reconfigurable vehicle (such as the aircraft 10) based on the selection data and the availability data. For example, the forecast may be based on the number of passengers that have selected a particular type of cabin module, and the types of cabin module that have been selected.

In examples, the commissioning system is operable to communicate with the forecasting system 60, the tracking and availability system 70, and the ground handling system 50 via suitable communication links such as fibre-optic communication link, or Ethernet, although it will be appreciated that any appropriate communication link or links such as a wireless link could be used. In examples, the commissioning system 80 is operable to generate commissioning data indicative of cabin modules to be loaded on the reconfigurable vehicle, such as the aircraft 10.

In examples, the forecasting system 60 is operable to modify the forecast based on the updated availability data and the updated selection data, and to finalise the forecast so as to generate the commissioning data. In examples, the commissioning system 80 is operable to cause the reconfigurable vehicle to be loaded with one or more cabin modules based on the commissioning data. For example, the commissioning system 80 may send the commissioning data to the ground handling system 50 so as to cause cabin modules selected in the finalized forecast to be loaded on the aircraft 10. In examples, the tracking and availability system 70 is operable to update the inventory data based on the cabin modules that are loaded on the reconfigurable vehicle, such as the aircraft 10.

Therefore, for example, the vehicle may be configured based on passenger wishes, but may also take into account any changes of selection, or availability of cabin modules for example. Thus, a likelihood that a more appropriate selection of cabin modules may be loaded on the vehicle may be improved.

Figure 3:
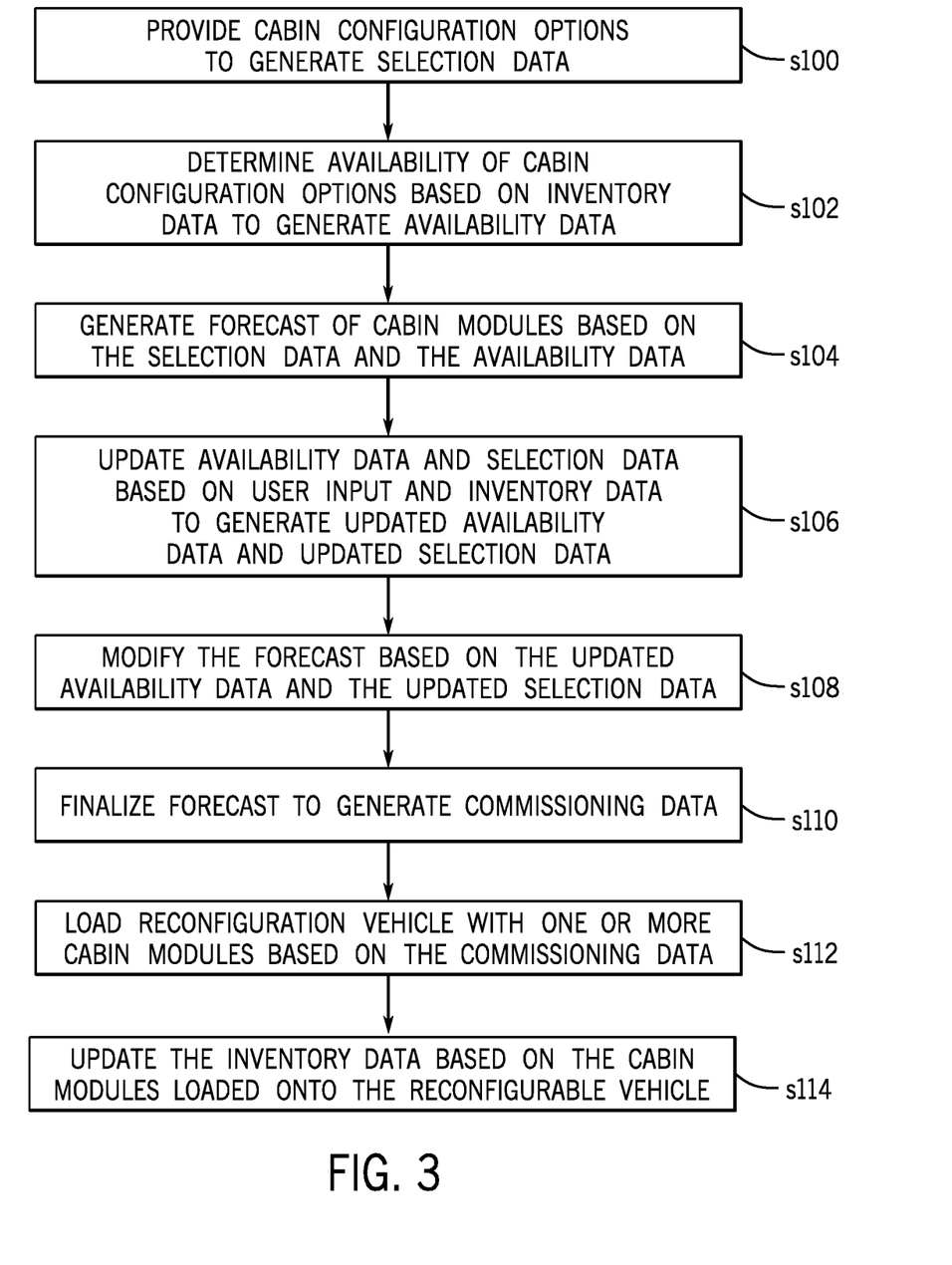
FIG. 3 is a flow chart of a method for configuring an interior of a reconfigurable vehicle according to examples of the disclosure.

FIG. 3 is a flow chart of a method for configuring an interior of a reconfigurable vehicle according to examples of the disclosure. Steps of the method of FIG. 3 may be performed by one or more elements of the system 20 described above with reference to FIG. 2.

At a step s100, a plurality of possible cabin configuration options are provided to a plurality of users for selection by the plurality of users, for example by the user interface system, so as to generate the selection data. As mentioned above, in examples, the selection data is indicative of cabin configuration options selected by the users, and the cabin configuration options relate to types of configuration of the one or more cabin modules.

At a step s102, an availability of cabin configuration options is determined, for example by the tracking and availability system 70, based on the inventory data so as to generate availability data. As mentioned above, in examples, the inventory data relates to types of configuration of cabin modules that are currently available for use.

At a step s104, a forecast of cabin modules predicted to be loaded on the reconfigurable vehicle is generated, for example by the forecasting system 60, based on the selection data and the availability data.

At a step s106, the availability data and the selection data is updated substantially in real time, for example by the tracking and availability system 70, based on the inventory data and user input to the user interface system so as to generate updated availability data and updated selection data.

At a step s108, the forecast is modified, for example by the forecasting system 60, based on the updated availability data and the updated selection data.

At a step s110, the forecast is finalized, for example by the forecasting system 60, so as to generate commissioning data indicative of cabin modules to be loaded on the reconfigurable vehicle.

At a step s112, the reconfigurable vehicle is loaded with one or more cabin modules based on the commissioning data, for example by the ground handling system.

At a step s114, the inventory data is updated, for example by the tracking and availability system 70, based on the cabin modules that are loaded on the reconfigurable vehicle.

In examples, the steps of FIG. 3 may be carried out sequentially, for example in the order in which they are described. However, it will be appreciated that one or more of the steps could be performed in parallel with each other, or in other appropriate orders or sequences as applicable.

Therefore, for example, the forecast may be based on substantially real-time availability of cabin modules, and any changes that users may make before departure. The examples of the disclosure may thus, for example, allow a more flexible system to be provided that may take into account or reflect a current situation of availability and user choice.

Figure 4:
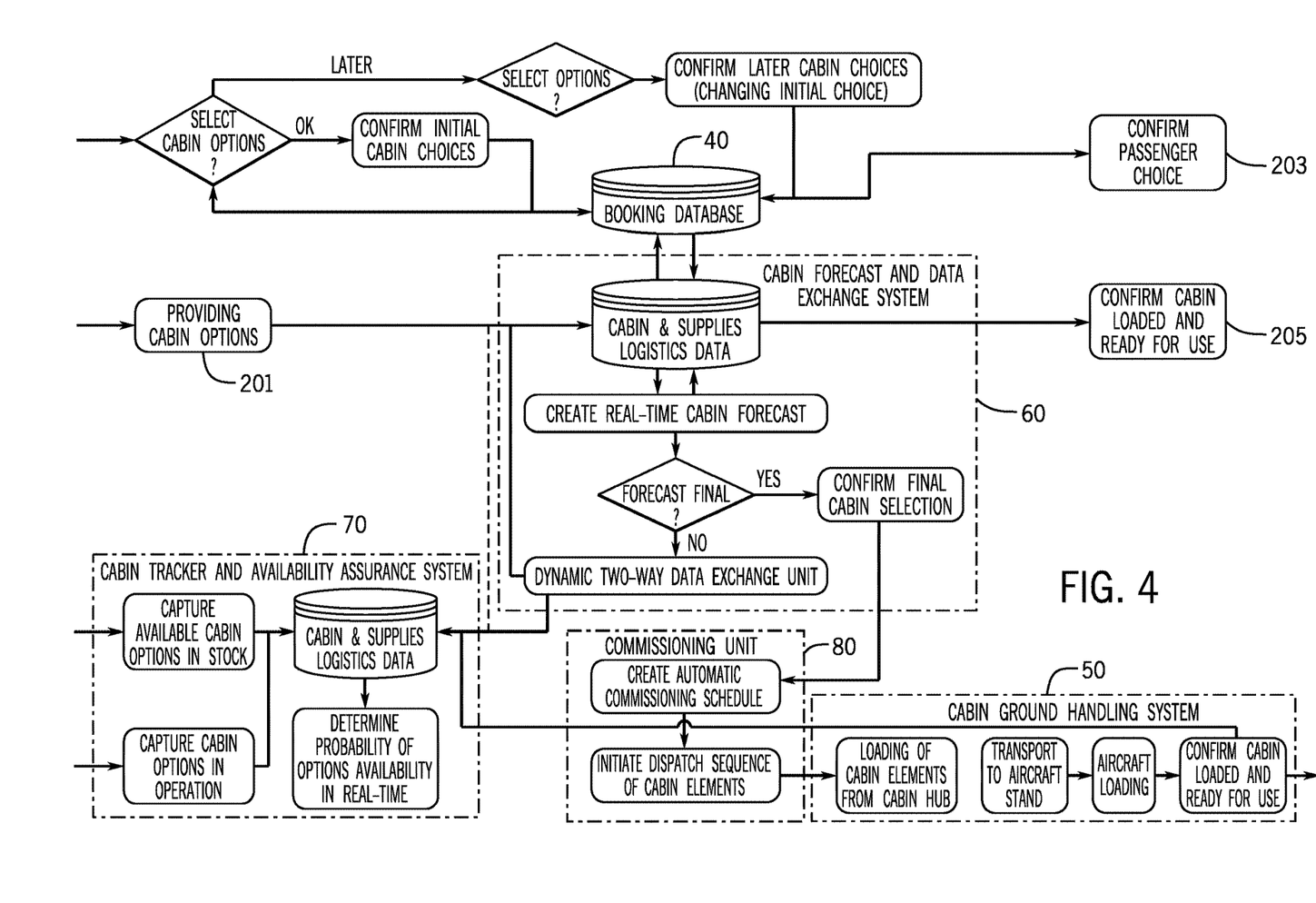
FIG. 4 schematically shows an overview of a process flow of the method and system according to examples of the disclosure.

Further details of the system and method of examples of the disclosure will now be described with reference to FIGS. 4 to 8. FIG. 4 schematically shows an overview of a process flow of the method and system according to examples of the disclosure. In particular, with reference to FIG. 4, the ground handling system 50 comprises a cabin ground handling system, the forecasting system 60 comprises a cabin forecast and data exchange system, the tracking and availability system 70 comprises a cabin tracker and availability assurance system, and the commissioning system 80 comprises a commissioning unit. In examples, the system 20 comprises a cabin option providing unit 201, a passenger choice confirmation unit 203, and a cabin loading confirmation unit 205.

In examples, the cabin option providing unit 201 is operable to communicate with the forecasting unit 60 so as to provide cabin options that may be available such as types of cabin options that the airport operator or airline could access. In examples, the cabin option providing unit is operable to communicate with the user interface system, for example via the booking data base 40 so as to be able to provide a list of possible cabin module options to a user for their selection.

In examples, the passenger choice confirmation unit 203 is operable to communicate with the database 40, for example to provide confirmation to the passenger or user of their choice such as via a confirmation email. In examples, the cabin loading confirmation unit 205 is operable to communicate with the forecasting system 60 and the ground handling system, for example, so as to indicate which cabin modules have been loaded on the aircraft 10, as will be described in more detail later below.

Figure 5:
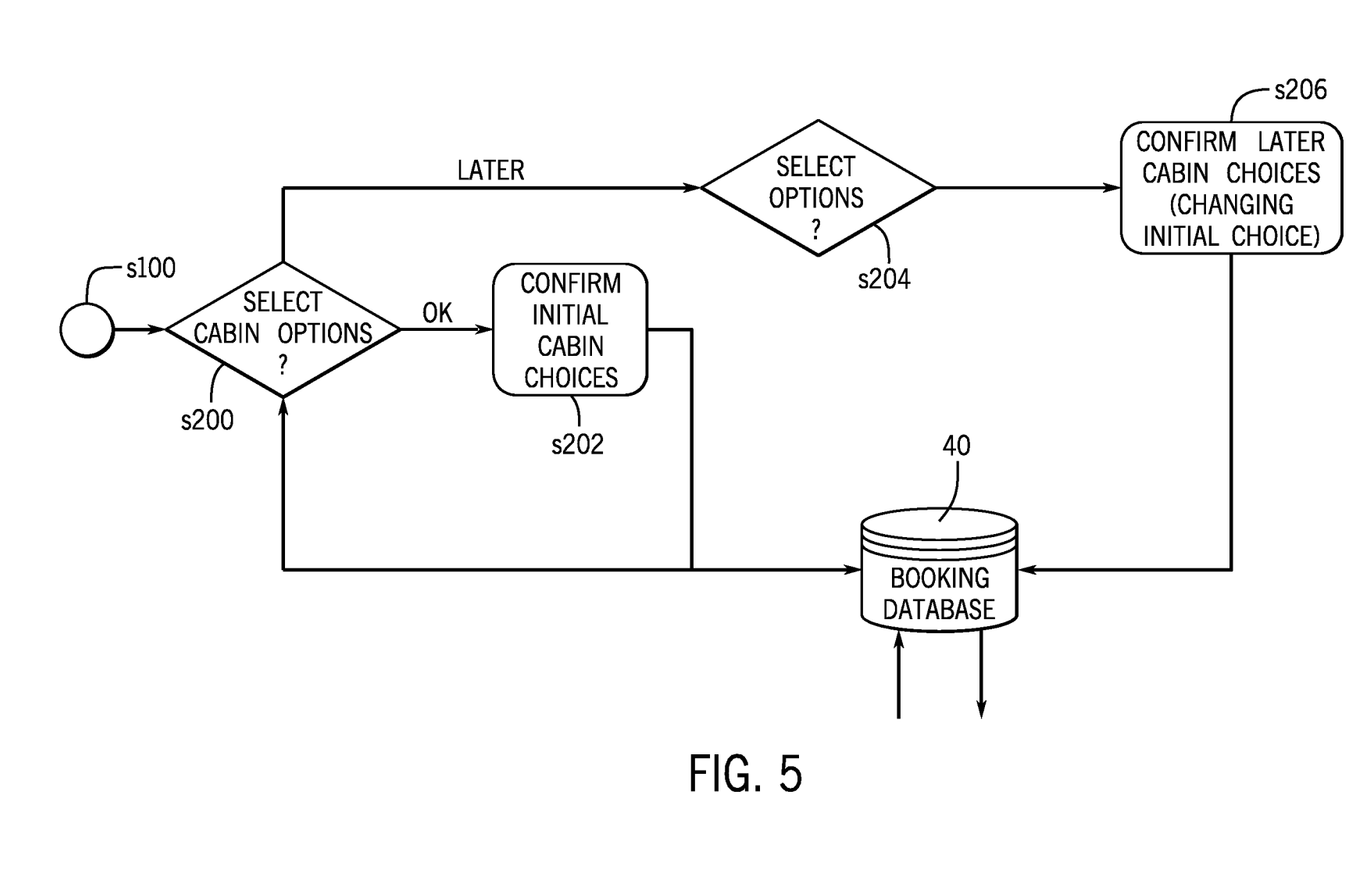
FIG. 5 schematically shows a user interface system process of the process flow according to examples of the disclosure.

Examples of specific details of FIG. 4 will now be with reference to FIGS. 5 to 8. FIG. 5 schematically shows a user interface system process of the process flow according to examples of the disclosure. In particular, FIG. 5 shows operations that may be carried out by the user interface system 30.

As mentioned above, in examples as part of the step s100, a user may be presented with a plurality of cabin configuration options such as via a suitable graphical user interface on a user device associated with the user (e.g. computer, mobile phone/smart phone, tablet computing device and the like). At a step s200, a user may select one or more options such as cabin configuration options. In examples, the cabin configuration options presented to the user are predefined, for example based on options that the airline offers, or based on the class of their ticket. For example, a user with a first class or business class ticket may be presented with more options than a user with an economy class ticket. In examples, option data indicating which options a user can select may be provided from the booking database 40.

In examples, if a user confirms that their initial cabin choices are ok, for example via suitable input to the user device at an initial selection or booking session (such as when they first select and confirm one or more cabin choices or options, or first book a ticket), then, at a step s202, the user's initial cabin choices are confirmed in the user interface system and choice data sent to the booking database 40 indicating the user's choice. In examples, the user could be presented with preset cabin choices. In examples, the cabin choices may be preset based on a user's saved preferences for example. In other examples, cabin choices such as cabin module configuration options may be preset by the airline when the user's booking is confirmed, so as to provide one or more default options, for example in case the user does not make a selection at the time of booking. In examples, the cabin choices may be preset based on a user's saved preferences for example.

At a time later than their initial choice, in examples a user may also select, at a step s204, options such as cabin configuration options, so that their initial choice may be confirmed and changed at a step s206. The booking database 40 may then be updated accordingly. In examples, a user may make their initial choice or update their choice within a time period defined with respect to the scheduled departure time of the aircraft.

In other words, more generally, in examples the selection data is generated by user selection within a predetermined time period before a scheduled departure time of the vehicle. The predetermined time period may be such that enough time may be allowed for the aircraft to be loaded with the cabin modules before the scheduled departure time. For example, a user may be provided with cabin configuration options for a predetermined time period of 36 hours, which ends 12 hours before the scheduled departure time of the aircraft. However, it will be appreciated that any other suitable predetermined time period could be used.

Figure 6:
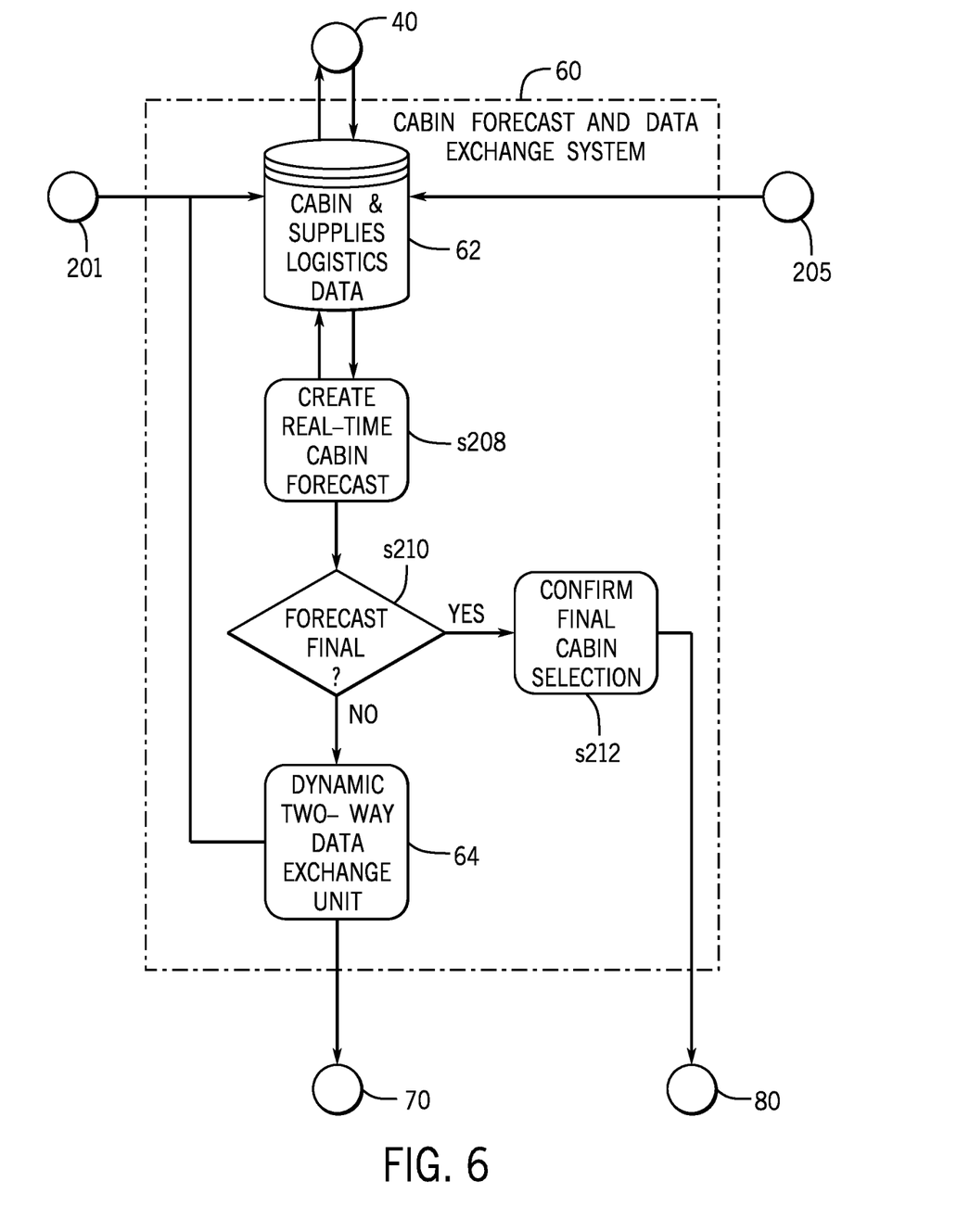
FIG. 6 schematically shows a cabin forecast and data exchange system according to examples of the disclosure.

FIG. 6 schematically shows a cabin forecast and data exchange system according to examples of the disclosure. As mentioned above, the forecasting system 60 comprises the cabin forecast and data exchange system, for example as shown in FIG. 6. In examples, the forecasting system comprises a cabin and supplies logistics database 62 and a dynamic two-way data exchange unit 64. In examples, the logistics database is operable to be able to store the availability data and the updated availability data. The data exchange unit 64 is operable to communicate with the logistics database 62 and the tracking and availability system 70. In examples, the forecasting system 60 is operable, at a step s208, to create a real-time cabin forecast substantially in real time, for example based on data exchanged with the logistics database 62. For example, the step s208 may be performed as part of the step s104 and/or the step s108 described above. In examples, the forecast indicates a probability of a particular cabin configuration being loaded. For example, the forecast may relate to a probability that particular cabin modules may be used for a particular flight.

In examples, the forecast is weighted according to one or more forecast criteria. This may help in planning of deployment or loading/unloading of cabin modules or operational requirements of an aircraft, airline, or airport for example.

For example, the forecast criteria may relate to criteria such as options selected by the users (passengers), airline preferences for which cabin modules to use, for example based on cost, options based on number of users with each class of ticket, options based on desired features or ambience/intended experience provided by the aircraft, such as a relaxation experience (e.g. cabin modules configured as a spa, sleeping area, relaxation area, and the like), a party experience (e.g. cabin modules configured as a bar, and a dance floor area) or a child friendly experience (e.g. cabin modules configured as a play area, café, and cinema) and the like. However, it will be appreciated that other forecast criteria could be used.

In examples, the forecast criteria relate to cabin configuration features corresponding to those selected by a majority of users. For example, if a majority of users select a café module, then a weighting of a likelihood of a café module being required for that flight may be adjusted to indicate that a café module is more likely to be required.

In examples, the forecast criteria are based on cabin configuration features preferred by an operator of the vehicle, such as a party experience, relaxation experience, or child friendly experience, for example based on a holiday package offered by the airline. In examples, the forecast criteria are based on priority preference criteria of an operator of the vehicle, such as the airline, for example to give priority of selection to users who are within a certain category, such as defined by a rewards points program or a certain class of ticket. In examples, artificial intelligence or machine learning may be used to determine or generate the forecast, for example based on past bookings or to optimize selection of cabin modules. However, it will be appreciated that other suitable ways of defining the forecast criteria and corresponding weighting may be employed.

In examples, the forecasting system is operable, at a step s210, to determine whether the forecast is final. In examples, the forecast is finalized at a predetermined time before a scheduled departure time of the vehicle, such as 12 hours before the scheduled departure time of the vehicle (such as the aircraft 10), although it will be appreciated that any suitable predetermined time could be used, or other methods of determining if the forecast is final could be used. For example, the step s210 may be performed as part of the step s110 mentioned above. In examples, the airline, or vehicle operator could determine that the forecast is final, for example based on operational requirements so as to confirm which cabin modules should be used for a particular flight.

In examples, as mentioned above, the availability data and the selection data may be updated based on user input and inventory data. If the forecast is not final, then the data exchange unit 64 is operable to communicate with the logistics database 62 and the booking database so the forecasting system 60 can modify the forecast based on the updated availability data and the updated selection data. For example, if all of a particular type of cabin module, such as those configured as a café cabin module, are being used for other vehicles or already finalized for use on other vehicles, then the forecasting system 60 may generate the forecast so as to indicate a low likelihood (or zero likelihood) of café cabin modules being used on a flight for which the forecast is being generated. In examples, the data exchange system may also communicate with availability and tracking system 70 so as to indicate which cabin modules are currently predicted to be used for the flight for which the forecast is being generated.

In examples, if it is determined that the forecast is final, for example the predetermined time before the scheduled departure time corresponds to a current time or has already passed, then the forecasting system 60 is operable, at a step s212, to confirm the final cabin selection, such as which cabin modules are to be loaded on the vehicle, such as the aircraft 10. This information may be passed to the commissioning system 80 so as to allow the commissioning data to be generated. For example, the step s212 may be performed as part of the step s110.

Figure 7:
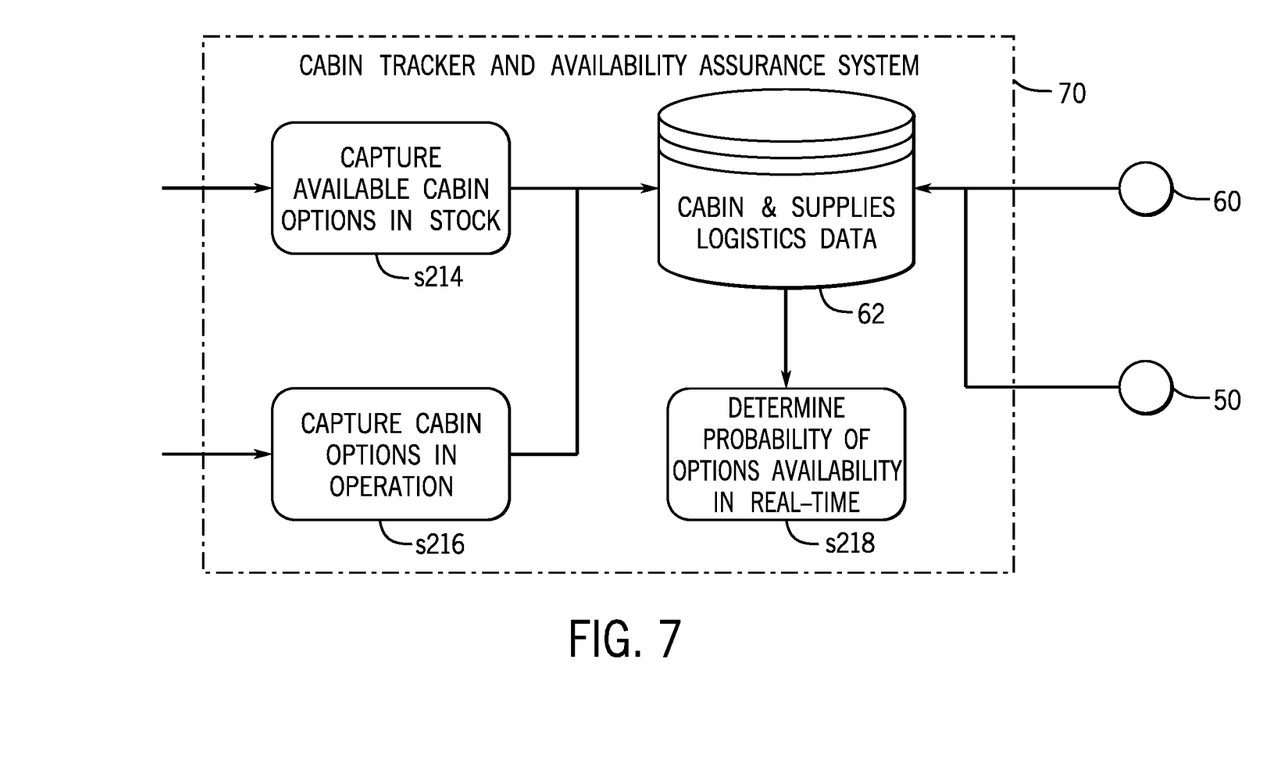
FIG. 7 schematically shows a cabin tracker and availability assurance system according to examples of the disclosure.

FIG. 7 schematically shows a cabin tracker and availability assurance system according to examples of the disclosure. As mentioned above, in examples, the tracking and availability system 70 comprises the cabin tracker and availability assurance system. In examples, the tracking and availability system 70 comprises the logistics database 62, although in other examples, the tracking and availability system 70 may implement a dedicated cabin and supply logistics database, which is different from the logistics database 62. In examples, the tracking and availability system 70 is operable to determine availability of the one or more cabin modules as well as track their location, for example based on location data generated by the cabin modules, or recorded in the logistics database.

In examples, the tracking and availability system 70 is operable, at a step s214, to capture or determine available cabin options in stock, for example to determine which cabin modules are currently stored in a warehouse or storage unit for use. In examples, the tracking and availability system 70 is operable, at a step s216, to capture or determine cabin options in operation, for example based on cabin modules that are determined to be already being used on other vehicles. Information generated at the steps s214 and s216 may be used to update or maintain availability data stored in the logistics database 62. In examples, the steps s214 and s216 may be performed as part of the step s106 mentioned above.

In examples, the tracking and availability system 70 is operable, at a step s218, to determine a probability of cabin configuration options being available. In examples, the tracking and availability system 70 is operable to determine the probability substantially in real time. However, it will be appreciated that one or more of the other systems of the system 20 such as the forecasting system 60 could also be used to determine the probability, instead of, or in cooperation with the tracking and availability system 70. For example, the probability may be based on one or more of which cabin modules are currently in use, what cabin modules are scheduled to be used within a particular time scale (e.g. based on commissioning data related to other vehicles or aircraft), and the user selection data.

In examples, stochastic and/or data analytic principles may be used to generate, compute, or predict unknown or un-modelled data relating to cabin option configuration availabilities.

In examples, stochastic modelling employing Markov chains is used to generate probability data indicative of the probability of one or more cabin configuration options being available. This may be useful if, for example, there is little or no historical data available, such as in real-time data capture of a situation. For example, stochastic modelling may be employed in relation to real time data capture of a passenger or passengers' cabin preferences and cabin configuration options.

In other examples, the probability data is based on analytical statistical modelling which relates to a historical data set. In examples, the historical data set comprises history data relating to one or more of: changes in cabin configuration during a booking period, information about seasonal cabin option configuration preferences and any associated changes, flight data linked to cabin settings, and passenger age and needs/requirements. However, it will be appreciated that the historical data set could comprise other suitable historical data. In examples, the analytical statistical modelling may be used to help determine a probability of a required configuration and/or cabin configuration profile of a particular flight. For example, the historical data may be used to help determine a probability of available cabin configuration choices for a particular or planned flight. In examples, choices or inputs that passengers may make prior to a flight (for example at the step s200 or the step s204 may also be considered as historical data.

In examples, stochastic modelling may be combined with analytic methods based on historical data, although it will be appreciated that the probability may be based on other suitable parameters or data.

In examples, data such as the availability data stored in the logistics database 62 may be updated based on availability data received from the forecasting system 60 and the ground handling system 50 for example as part of the step s114 or the step s106. Therefore, for example, the logistics data may be kept substantially up to date so as to correspond to any changes that may occur. In other words, for example, the tracking and availability system 70 may help monitor and update the available cabin modules that may be provided as cabin configuration options substantially continuously. This may for example help the system operate autonomously with little or no operator intervention.

Figure 8:
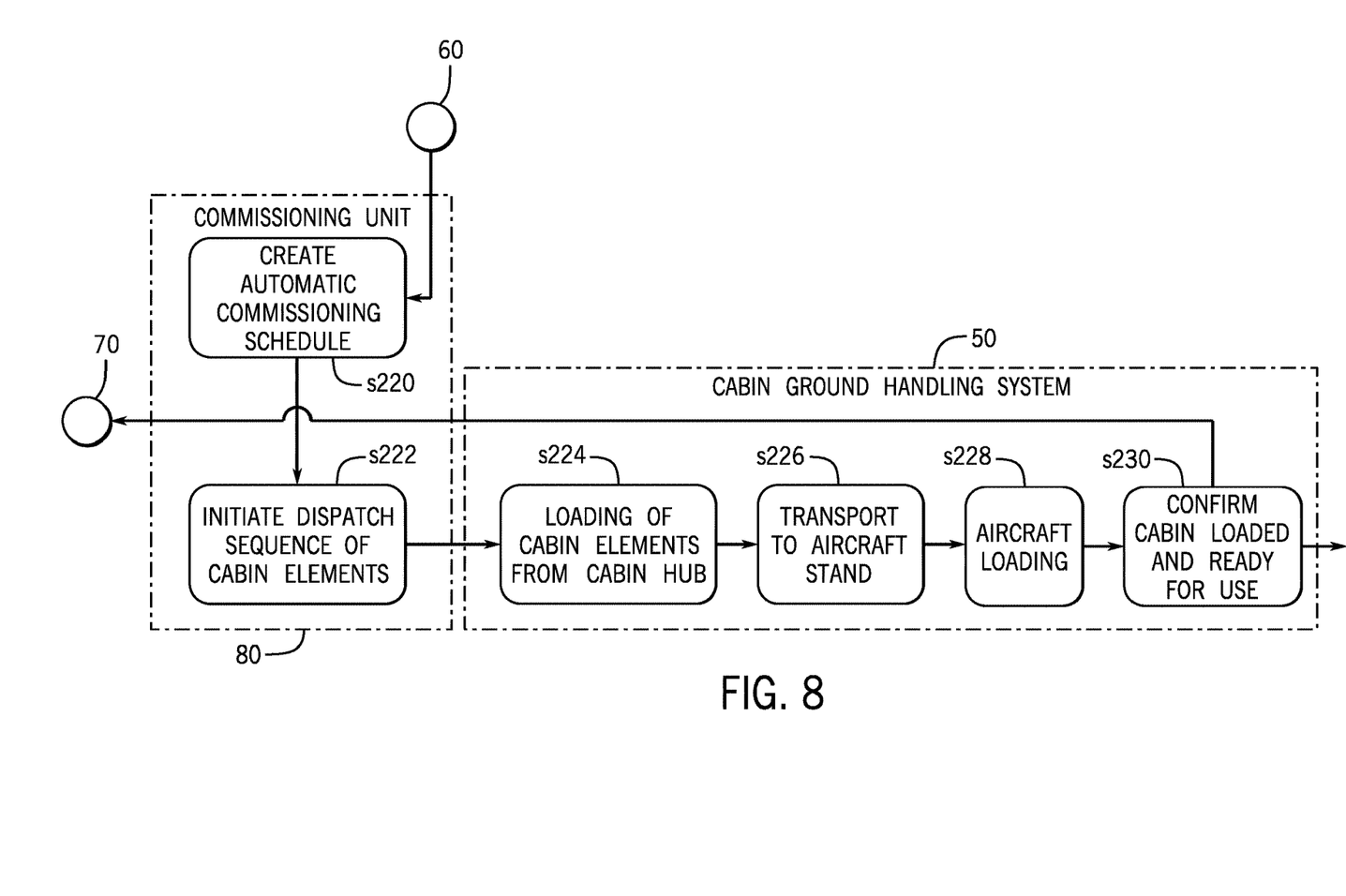
FIG. 8 schematically shows a commissioning unit and cabin ground handling system according to examples of the disclosure.

FIG. 8 schematically shows a commissioning unit and cabin ground handling system according to examples of the disclosure. As mentioned above, in examples, the commissioning system 80 comprises the commissioning unit, and the ground handling system 50 comprises the cabin ground handling system. In examples, the commissioning unit may be a standalone system or be integrated with one or more other hardware and/or software systems.

In examples, the commissioning system 80 is operable, at a step s220, to create or generate an automatic commissioning schedule. In examples, for example, the term automatic in this context should be taken to mean that substantially no user input is required. In examples, the commissioning schedule comprises commissioning data. In examples, the commissioning data may indicate which cabin modules are to be loaded on a particular vehicle. In examples, the commissioning system 80 is operable to be able to control the ground handling system 50 for example via communication of suitable control signals, for example in relation to loading and/or unloading of one or more cabin modules onto or off one or more vehicles such as one or more aircraft.

In examples, at a step s222, the commissioning system 80 is operable to initiate a dispatch sequence of cabin elements such as cabin modules. In examples, the dispatch sequence comprises dispatch sequence data which relates to an order in which cabin modules are to be loaded on to the reconfigurable vehicle. In examples, the ground handling system can cause cabin modules to be loaded on the aircraft 10 based on the dispatch sequence data. In examples, the step s220 and the step s222 may be performed as part of the step s110 mentioned above.

In examples, the ground handling system 50 is operable, at a step s224, to cause one or more cabin modules (cabin elements) to be loaded from a cabin hub (such as a storage and distribution area for the cabin modules) on suitable transport elements such as one or move cabin module transport vehicles. In examples, the types and numbers of cabin modules that are loaded on the cabin module transport vehicles depends on the commissioning data generated by the commissioning system 80. In examples, a sequence in which cabin modules are loaded from the cabin hub on the cabin module transport vehicle(s) is based on the dispatch sequence data.

At a step s226, in examples, the ground handling system 50 is operable to cause the cabin modules to be transported to an aircraft stand of the aircraft 10. At a step s228, the ground handling system is operable to cause the cabin modules to be loaded on the aircraft.

In examples, the cabin loading confirmation unit 205 in cooperation with the ground handling system is operable, at a step s230, to confirm that the cabin modules are loaded on the reconfigurable vehicle and ready for use. In examples, one or more of the steps s224, s226, s228, and the step s230 may be performed as part of the step s112 mentioned above. The logistics database may then be updated based on which cabin modules were loaded on the aircraft, for example by update data sent form the ground handling system 50 and/or the cabin loading confirmation unit 205 to the tracking and availability system 70, for example to perform the step s114 mentioned above. Thus for example, the ground handling system 50 may thus help provide a substantially real time picture of which cabin modules may be available because which cabin modules are loaded on vehicles may be tracked by the tracking and availability system 70.

Therefore, for example, examples of the disclosure may help provide a system and method for configuring an interior of a reconfigurable vehicle that is more flexible and may allow any changes, such as those occurring from user selection or modification, and/or form those occurring due to operational requirements to be taken into account. Furthermore, for example, any changes which may be desired, may be made more closely to the departure time than is currently possible.

Although in the above examples cabin modules have been described with reference to an aircraft, it will be appreciated that the system and method of examples of the disclosure are also applicable with other types of vehicle or transport vessel for example, such as trains, buses, boats, spaceships or space craft, helicopters, drones, or other vehicles. In examples, the cabin modules described herein are passenger cabin modules, for example, for use by one or more passengers of the vehicle. However, it will be appreciated that they could be configured as cargo modules with changes as appropriate. In examples, a user or users mentioned herein may be a passenger or may be passengers of the vehicle. In examples, it will be appreciated that the terms "loading" and "loaded" could also include a situation in which one or more cabin modules are removed or taken off from the vehicle for example during a loading procedure, such as at the step s112. In other words, for example, loading may be taken to mean adding or removing one or more cabin modules to or from the vehicle.

It will be appreciated that although the above method and system of examples have been described above with reference to a forecast for reconfigurable vehicle, one or more forecasts could be generated in respect of one or more vehicles and the inventory data, availability data, selection data could be applicable to more than one journey for example. In other words for example, it is envisaged that the system and method of examples of the disclosure may be used in relation to a plurality of vehicles, users, transport hubs, depots, stations and the like, with changes as appropriate. Additionally, it will be appreciated that one or more of the examples of the systems described herein could be combined with one or more other systems, for example via integration of hardware and/or software functionality.

Although a variety of examples have been described herein, these are provided by way of example only and many variations and modifications on such examples will be apparent to the skilled person and fall within the spirit and scope of the present invention, which is defined by the appended claims and their equivalents.

The invention claimed is:

1. A method for configuring an interior f a reconfigurable vehicle using one or more cabin modules, the method comprising:
  providing, by a user interface system, a plurality of possible cabin configuration options to a plurality of users for selection by the plurality of users so as to generate selection data indicative of cabin configuration options selected by the users, the cabin configuration options relating to types of configurations of the one or more cabin modules.;
  determining an availability of cabin configuration options based on inventory data which relates to types of configurations of cabin modules that are currently available for use so as to generate availability data;
  generating a forecast of cabin modules predicted to be loaded on the reconfigurable vehicle based on the selection data and the availability data;
  updating the availability data and the selection data in real time based on the inventory data and user input to the user interface system so as to generate updated availability data and updated selection data;
  modifying the forecast based on the updated availability data and the updated selection data;
  finalizing the forecast so as to generate commissioning data indicative of cabin modules to be loaded on the reconfigurable vehicle;
  loading the reconfigurable vehicle with one or more cabin modules based on the commissioning data, comprising:
    initiating a dispatch sequence of cabin modules indicating an order in which cabin modules are to be loaded on to the reconfigurable vehicle;
    loading one or more cabin modules from a cabin module storage area on one or move cabin module transport vehicles;
    transporting the cabin modules to the reconfigurable vehicle stand;
    loading one or more cabin modules on the reconfigurable vehicle; and
  confirming that the cabin modules are loaded on the reconfigurable vehicle based on the commissioning data;
  updating the inventory data based on the cabin modules that are loaded on the reconfigurable vehicle; and
  wherein the forecast is finalized at a predetermined time before a scheduled departure time of the vehicle.

2. A method according to claim 1, wherein the forecast indicates a probability of a particular cabin configuration being loaded.

3. A method according to claim 1, wherein the selection data is generated by user selection within a predetermined time period before a scheduled departure time of the vehicle.

4. A method according to claim 1, wherein the users are passengers of the vehicle.

5. A method for configuring an interior of a reconfigurable vehicle using one or more cabin modules, the method comprising;
  providing, by a user interface system, a plurality of possible cabin configuration options to a plurality of users for selection by the plurality of users so as to generate selection data indicative of cabin configuration options selected by the users, the cabin configuration options relating to types of configurations of the one or more cabin modules;
  determining an availability of cabin configuration options based on inventory data which relates to types of configurations of cabin modules that are currently available for use so as to generate availability data;
  generating a forecast of cabin modules predicted to be loaded on the configurable vehicle based on the selection data and the availability data;
  updating the availability data and the selection data in real time based on the inventory data and user input to the user interface system so as to generate updated availability data and updated selection data;
  modifying the forecast based on the updated availability data and the updated selection data;
  finalizing the forecast so as to generate commissioning data indicative of cabin modules to be loaded on the reconfigurable vehicle;
  loading the reconfigurable vehicle with one or more cabin modules based on the commissioning data, comprising:
    initiating a dispatch sequence of cabin modules indicating an order in which cabin modules are to be loaded on to the reconfigurable vehicle;
    loading one or more cabin modules from a cabin module storage area on one or move cabin module transport vehicles;
    transporting the cabin modules to the reconfigurable vehicle stand;
    loading one or more cabin modules on the reconfigurable vehicle; and
  confirming that the cabin modules are loaded on the reconfigurable vehicle based on the commissioning data;
  updating the inventory data based on the cabin modules that are loaded on the reconfigurable vehicle; and
  wherein the forecast is weighted according to one or more forecast criteria.

6. A method according to claim 5, wherein the forecast criteria relate to cabin configuration features corresponding to those selected by a majority of users.

7. A method according to claim 5, wherein the forecast criteria are based on cabin configuration features preferred by an operator of the vehicle.

8. A method according to claim 5, wherein the forecast criteria are based on priority preference criteria of an operator of the vehicle.

9. A system for configuring an interior of a reconfigurable vehicle using one or more cabin modules, the system comprising:
  a user interface system operable to provide a plurality of possible cabin configuration options to a plurality of users for selection by the plurality of users so as to generate selection data indicative of cabin configuration options selected by the users, the cabin configuration options relating to types of configurations of the one or more cabin modules;
  a tracking and availability system operable to determine an availability of cabin configuration options based on inventory data which relates to types of configurations of cabin modules that are currently available for use so as to generate availability data;

a forecasting system operable to generate a forecast of cabin modules predicted to be loaded on the reconfigurable vehicle based on the selection data and the availability data; and a commissioning system operable to generate commissioning data indicative of cabin modules to be loaded on the reconfigurable vehicle, wherein:

the tracking and availability system is operable to update the availability data and the selection data in real time based on the inventory data and user input to the user interface system so as to generate updated availability data and updated selection data;

the forecasting system is operable to modify the forecast based on the updated availability data and the updated selection data, and to finalize the forecast so as to generate the commissioning data;

the commissioning system is operable to cause the reconfigurable vehicle to be loaded with one or more cabin modules based on the commissioning data, comprising:

initiating a dispatch sequence of cabin modules indicating an order in which cabin modules are to be loaded on to the reconfigurable vehicle;

loading one or more cabin modules from a cabin module storage area on one or move cabin module transport vehicles;

transporting the cabin modules to the reconfigurable vehicle stand;

loading one or more cabin modules on the reconfigurable vehicle; and confirming that the cabin modules are loaded on the reconfigurable vehicle based on the commissioning data;

the tracking and availability system is operable to update the inventory data based on the cabin modules that are loaded on the reconfigurable vehicle, and the forecast is finalized at a predetermined time before a scheduled departure time of the vehicle.

\* \* \* \* \*